United States Patent [19]

Lukens, Jr.

[11] Patent Number: 4,702,664
[45] Date of Patent: Oct. 27, 1987

[54] AIR-EQUIPPED TABLE
[75] Inventor: J. Paul Lukens, Jr., Perkasie, Pa.
[73] Assignee: Phillocraft Company, Montgomeryville, Pa.
[21] Appl. No.: 926,859
[22] Filed: Nov. 4, 1986

Related U.S. Application Data

[63] Continuation of Ser. No. 749,453, Jun. 27, 1985, abandoned.

[51] Int. Cl.$^4$ ............... D06H 7/00; B26D 7/01
[52] U.S. Cl. ................... 414/676; 83/451; 271/195; 406/88; 414/903
[58] Field of Search ............ 269/20; 406/38, 88, 406/84, 89, 95; 414/676, 903; 83/374, 451, 925 CC; 271/195

[56] References Cited

U.S. PATENT DOCUMENTS 3,473,910  10/1969  Wilde et al. ................ 406/88 X
3,742,802   7/1973  Maerz ..................... 83/925 CC X
3,777,604  12/1973  Gerber ...................... 83/451 X
3,975,057   8/1976  Hurd ........................ 414/676 X
4,371,309   2/1983  Principe et al. .............. 406/88 X
4,418,511  12/1983  Collin ..................... 271/195 X
4,444,541   4/1984  Bergman ..................... 414/676

FOREIGN PATENT DOCUMENTS 678465   1/1964  Canada ........................ 269/20
1103849  3/1961  Fed. Rep. of Germany ...... 414/676
1497265  10/1967  France ........................ 406/88

Primary Examiner—Robert J. Spar
Assistant Examiner—Janice Krizek
Attorney, Agent, or Firm—Steele, Gould & Fried

[57] ABSTRACT

An air-equipped table is disclosed which includes a frame mounted table top of sturdy, planar construction. The table top is formed with a laminate of a thin top hardboard layer, a thin bottom hardboard layer and a relatively thick particle board layer sandwiched therebetween. A plurality of air distribution channels are formed in the particle board layer prior to lamination to provide an integral air distribution system beneath the table top surface. A plurality of equally spaced orifices are drilled through the thin top layer to communicate with the air distribution channels in a manner to provide a uniform air cushion over the table surface. An air moving unit is interconnected with the air distribution channels and is designed to provide either air pressure or suction forces at the plurality of orifices.

4 Claims, 5 Drawing Figures

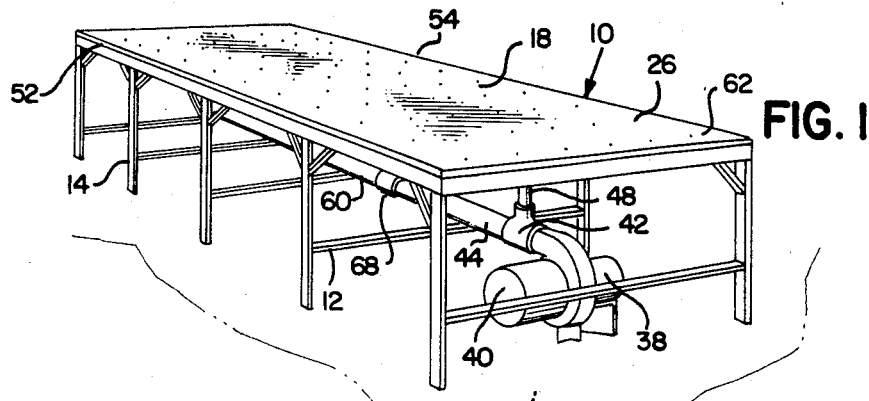

AIR-EQUIPPED TABLE

This is a continuation of application Ser. No. 749,453, filed June 27, 1985, now abandoned.

BACKGROUND OF THE INVENTION

1. Field of the Invention

The present invention relates generally to the field of modular work tables, and more particularly, is directed to a spreading table equipped with an improved air distribution system.

2. Description of the Prior Art

Elongated, modular work tables have long been in use in connection with various types of manufacturing and assembly procedures. Such tables usually include a sturdy, modular steel frame in combination with a flat, laminated top which is secured to and supported by the frame. It is the usual practice to fabricate such work tables of knock-down design whereby the tops can be separated from the framing members and the framing members themselves may be easily disassembled to facilitate packing and shipping in flat packages with minimum space requirements. Upon arrival at the final destination, the packaged table can be readily assembled into an extremely sturdy and reliable work surface by simply following the manufacturer's assembly instructions. Modular units can be connected together in end to end juxtaposition to form an elongate table of any desired modular length.

Such tables have gained widespread acceptance in the garment manufacturing industry and particularly have been utilized by manufacturers for fabric spreading and cutting tables. More recently, in order to facilitate the use of the tables for spreading purposes, pressurized air or vacuum capability has been incorporated to aid in the handling or cutting of a plurality of layers of spread cloth. This has traditionally been accomplished by prior workers in the art by adding a plenum chamber beneath the existing table top in a manner to apply quantities of pressurized air equally throughout the length and width of the table.

The prior art plenum chambers usually comprised an additional layer of sheet steel which was supported and sealed in spaced relation below the bottom of the table top to provide the required air space for air movement without undue frictional loss. The table top itself was then drilled or otherwise treated to form a plurality of openings communicating between the top surface of the table and the plenum chamber. An air pump together with suitable duct work or piping was connected to the plenum chamber in a known manner to provide the necessary air pressure or air cushion at the table surface to facilitate movement of the stacked layers of cloth or other fabric after the cloth layers had been spread upon the table.

The air tables as previously constructed were relatively expensive in manufacture and assembly and had to be rather precisely sealed and installed to prevent the loss of unacceptable quantities of air through leakage. Additionally, the prior art constructions were objectionable in that they required considerably more space when packaged and stored than was required by similar tables without the air capability due to the added space requirements of the plenum chamber itself. Further, the presently available air table plenum chamber constructions could not easily be converted for use with suction forces inasmuch as such forces had a tendency to cause distortion or buckling of the additional sheet steel layer unless some type of added reinforcing construction was designed and installed.

SUMMARY OF THE INVENTION

The present invention relates generally to an air assisted modular work table design wherein an improved integral plenum construction is employed in a manner to minimize fabrication, packaging, storage and shipping costs.

The common work table top construction as presently employed in the industry is usually a one inch laminate comprising a ⅛ inch hardboard top, a ⅛ hardboard bottom and a ¾ inch thickness particle board layer laminated therebetween. In accordance with the teachings of the present invention, prior to laminating the top, the particle board is routed, cut or otherwise treated to provide an axially aligned, transverse central manifold and a plurality of longitudinally aligned, transversely spaced, parallel distribution galleries. Each of the distribution galleries is in fluid communication with the central manifold in a manner to distribute pressurized air introduced into the central manifold substantially equally about the entire planar area of the table top.

After the main central manifold and the intercommunicating distribution galleries have been properly formed, the table top section of hardboard can then be laminated directly to the top surface of the particle board core over the routed areas, thereby enclosing the routed areas to form a complete, communicating air handling system or integral plenum chamber. The top hardboard can be drilled or pre-drilled to provide a plurality of openings or orifices in fluid communication with the central manifold and the plurality of distribution galleries. Preferably, the drilled openings or orifices are equally spaced about the table top in a manner to assure the equal application of the forces of the pressurized air throughout the length and width of the table top when the air-assisted table of the present invention is in use.

In order to provide a completely modular and workable air distribution system, an air inlet opening is formed through the bottom hardboard layer of each modular unit in communication with a portion of the central manifold. Preferably, the opening is threaded to easily connect an inlet air fitting for introduction of pressurized air into the integral air handling duct system or plenum chamber. In order to aid in the equalization of pressurized air forces throughout the system, the air inlet fitting preferably is centrally located with respect to the central manifold and can therefore be positioned at the intersection of the longitudinal and transverse axes of the modular table top.

If desired, the central manifold and the distribution galleries can be formed of greater cross sectional dimensions closest to the air inlet fitting to accommodate greater quantities of pressurized air nearest the inlet. As the central manifold and the distribution galleries extend more remotely away from the inlet fitting, smaller quantities of pressurized air will be flowing through the remote sections of the plenum chamber. Under such conditions, the cross sectional dimensions of the main and branch air distribution portions can be reduced in a manner to substantially equalize air velocity and volume flow conditions throughout the table top.

An air pump or blower of suitable design to develop the required volume and static pressure of operating air is secured beneath the table and sufficient lengths of tubing or piping are connected to the air pump discharge to introduce the pressurized air throughout the length of the modular table. In practice, a threaded inlet fitting is bottomly connected to the threaded inlet opening provided at each modular table unit and each inlet fitting in turn is connected in known manner to spaced portions of the air pump discharge tubing or piping.

It is therefore an object of the present invention to provide an improved air-equipped table of the type set forth.

It is another object of the present invention to provide a novel air-equipped table which comprises a laminated table to having a pressurized air distribution system integrally provided within the table top construction.

It is another objection of the present invention to provide a novel air-equipped table of modular construction wherein each module comprises a steel frame, a laminated planar top secured to the frame, an air distribution system integrally formed within the planar top, a plurality of orifices equally spaced about the top surface of the table top and communicating with the air distribution system, an air inlet fitting provided in the bottom of the table top in communication with the integral air distribution system, an air pump secured on the frame to supply the required volume of air under pressure and an air inlet duct system intercommunicating the air pump discharge with the air inlet fitting of each modular table unit.

It is another object of the present invention to provide a novel air-equipped table of the type set forth that is simple in design, efficient in operation and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view of an air-equipped work table constructed in accordance with the teachings of the present invention.

FIG. 2 is a top plan view of one module of the table of FIG. 1, on increased scale and partially broken away to expose interior construction details.

FIG. 3 is a side elevational view showing a modular air-equipped table construction.

FIG. 4 is an enlarged cross sectional view taken along line 4—4 on FIG. 2 looking in the direction of the arrows.

FIG. 5 is an enlarged cross sectional view taken along line 5—5 on FIG. 2 looking in the direction of the arrows.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIGS. 1, 2 and 3 an elongated air-equipped table 10 which is formed of a plurality of similar table modules connected together in end to end juxtaposition in known manner. Each module comprises generally a steel frame 12 of suitable strength for the intended duty and a planar top 18 which is securely supported by the frame. The frame includes a plurality of structural steel legs 14 and suitable additional structure and bracing to sturdily carry the table top 18 in spaced relation above the floor 16.

An air pump 38, which may also include a vacuum capability, is affixed in secure manner to a structural member of the module frame 12 at one end of the table 10 and has its discharge 42 connected to a modular length of discharge piping 44. As illustrated, the pump 38 draws its suction 40 from the ambient air. When the pump is operated in its vacuum mode, the direction of air flow would be reversed. The pump discharge would then be through the nominal pump suction inlet 40 and the pump suction would be through the nominal pump discharge 42.

Referring now to FIGS. 2, 4 and 5, each modular table top 18 is formed of a laminated planar construction comprising a top hardboard layer 20, a bottom hardboard layer 22 and a particle board layer 24 sandwiched therebetween. Preferably, in the interest of providing maximum strength with a minimum of thickness while using readily available materials, the top and bottom layers 20, 22 are formed of conventional ⅛ inch thick hardboard and the middle laminate or layer is formed of conventional ¾ inch thick particle board 24. Accordingly, when the layers are laminated, the overall thickness of the table top will be one inch.

As best seen in FIG. 2, prior to lamination, the top region of the particle board layer 24 is routed or otherwise treated to provide an extended air distribution system that is integral within the laminated top construction. In a preferred embodiment, a central manifold 30 is transversely arranged in alignment with the transverse axis of the table top. As shown, the central manifold 30 is formed approximately 1¾ inches in width, approximately ⅝ inches in depth and extends in length from a point near the table top front edge 52 to a point near the table top rear edge 54. In this manner, air under pressure from the pump 38 can be impressed substantially entirely transversely across the table top construction without any requirement of an exterior, depending, separate plenum chamber.

Still referring to FIG. 2 and additionally as illustrated in FIG. 5, a plurality of transversely spaced, longitudinally aligned distribution galleries or branch passages 32 are routed in or otherwise provided in the particle board core 24 in a distribution pattern designed to supply substantially equal quantities of pressurized air from the air pump 38 longitudinally and transversely over the entire top surface 62 of the table 10. In one embodiment when using a 66 inch by 48 inch table construction, satisfactory operating results were obtained by fabricating the galleries ⅝ inches in width, ⅝ inches in depth and extending to approximately 5⅝ inches from each of the front and rear table edges 52, 54. The left and right gallery edges 64, 66 terminate approximately three inches from each of the left and right table edges 56, 58. A gallery to gallery distance of approximately 7¼ inches has been successfully employed.

The top hardboard laminate or layer 20 is drilled or otherwise treated to provide a plurality of top orifices 26, which orifices extended completely through the top hardboard layer and communicate with spaced portions of the main central manifold 30 and the distribution galleries 32. The orifices 26 are uniformly positioned about the table top 18 to introduce pressurized air equally throughout. In a preferred construction, the orifices 26 are positioned along each distribution gallery 32 at ten inches on centers and along the central manifold 30 7¼ inches on centers. In the illustrated embodiment, the central manifold sides 34 and the distribution gallery sides 36 are shown in parallel configuration with similar cross sectional dimensions throughout the length. It is within the intent and scope of this invention to also fabricate the central manifold 30 and the distribution galleries 32 of unequal cross section throughout their respective lengths wherein the cross sectional configurations will be greater closer to air inlet 28 and smaller as the central manifold 30 and distribution galleries 32 extend away from the air inlet 28. In this manner, the air velocities and pressures can be substantially equally balanced throughout the system by providing larger size distribution channels where the air quantities are greater.

Referring now to FIGS. 1, 3 and 4, an air pump 38 is securely mounted upon a portion of a table frame 12 and draws its suction 40 from the ambient air. A length of discharge piping 44 comprising modular lengths 60 of similar pipes or tubes connected by a suitable fitting 68 exends from the air pump discharge 42 completely beneath the table top 18 and terminates at a conventional end cap 50 or other suitable end closure fitting. A length of branch piping 48 interconnects each central manifold 30 with the discharge piping 44 through a suitable inlet fitting 46. Preferably, in an extremely simple, substantially leakproof interconnection, the bottom hardboard 22 and the particle board layer 24 can be threaded 70 to provide a relatively easy interconnection for the threaded inlet fitting 46. By reversing the direction of rotation, the air pump 38 can be utilized as a vacuum pump when so desired to thereby develop overall vacuum forces across the table top 18 whenever so desired by the table operator. One air pump that has been found satisfactory for both pressure and vacuum service is regenerative blower number DR 606 as manufactured by Rotron, Inc., Woodstock, N.Y.

In use, the blower 38 is energized in the usual manner to discharge sufficient quantities of air through the plurality of equally spaced orifices 26 to form an air cushion or air layer over the entire top surface 62 of the table top 18. The air cushion is applied directly against the underside of the stack of multiple plies of fabric (not shown) that have been spread upon the air equipped table 10 in a manner to be interposed between the bottom layer of the spread and the top surface of the table. This air layer or cushion functions to facilitate movement of the spread fabric relative to the table with a minimum of force. Upon reversal of direction of the blower motor, the air system will then be operated in its vacuum mode and suction forces will then be applied substantially equally over the entire top surface of the table through the plurality of orifices 26. In this manner, a single table design can be employed for either pressurized air cushion operation or vacuum operation, depending upon the specific requirements of the table operation.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. An air-equipped table comprising
a frame;
a table top supported by the frame, the table top having a top
surface and a bottom surface,
the table top comprising a lamination of a relatively thin top layer, a relatively thin bottom layer and an intermediate layer that is at least twice the thickness of the combined thickness of the top and bottom layers, the intermediate layer having a top in contact with the top layer and a bottom in contact with the bottom layer,
the table top intermediate layer being provided with a plurality of integral interconnected air channels arranged in a pattern to provide an air cushion that is substantially equally distributed about the top surface, the air channels being formed in the intermediate layer such that they communicate with the bottom of the top layer and they do not communicate with the bottom layer,
the interconnected air channels being positioned intermediate the said top surface and bottom surface,
the air channels being closed by the said top layer;
the table top having an air inlet in fluid communication with the integral air channels and a plurality of air outlet orifices in fluid communication with the integral air channels,
the orifices being arranged in a uniform pattern over the top surface of the table top and through the top layer,
each of the orifices penetrating the top layer of the table top and extending from the top surface of the table top to a portion of the air channels to direct air from the air channels to the said top surface; and
air system means supplying air at non-atmospheric pressure to the said air inlet;
whereby the air from the air system means is subdivided and substantially equally distributed over the top surface through the integral air channels and the plurality of orifices.

2. The air equipped table of claim 1 wherein the integral air channels comprise a large manifold and a plurality of smaller distribution galleries in fluid communication with the manifold and wherein the intermediate layer of the table top is solid material except at the location of the air channels.

3. The air equipped table of claim 2 wherein the distribution galleries and the manifold extend in depth a distance that is less than one half the thickness of the intermediate layer.

4. The air equipped table of claim 3 wherein the cross sectional area of the manifold is greater than four times the cross sectional area of a distribution gallery.

* * * * *